United States Patent [19]

Ott

[11] Patent Number: 5,320,401
[45] Date of Patent: Jun. 14, 1994

[54] VEHICLE ARM REST

[76] Inventor: Gary P. Ott, 2427 Overlook Dr., Gilbertsville, Pa. 19525

[21] Appl. No.: 11,284

[22] Filed: Jan. 29, 1993

[51] Int. Cl.$^5$ ............................................... B60J 9/00
[52] U.S. Cl. ................................................... 296/153
[58] Field of Search ......................... 296/153; 248/118

[56] References Cited

U.S. PATENT DOCUMENTS

| 3,129,974 | 4/1964 | Carter | 296/153 |
|---|---|---|---|
| 3,326,600 | 6/1967 | Mathews | 296/153 |
| 3,451,717 | 6/1969 | Carter | 296/153 |
| 3,603,637 | 9/1971 | DePinto | 296/153 |
| 5,205,606 | 4/1993 | Cassese | 296/153 |

*Primary Examiner*—Robert R. Song
*Attorney, Agent, or Firm*—Joseph J. O'Keefe; Charles A. Wilkinson

[57] ABSTRACT

A vehicle arm rest comprising a frame portion having a vertical panel, with a cushion pad support extending outwardly therefrom and a horizontal slot adjacent the upper end, and a flexible strap having interlocking fabric sections adjacent an intermediate portion and a lower end portion and a friction projection adjacent the strap upper end. The arm rest is mounted on a vehicle door by slipping the upper end of the flexible strap between the vehicle window glass and the adjacent molding that extends along the window gap of the window ledge of the door inner panel. The friction projection on the strap upper end wedges against the underside of the molding to fix the upper end of the strap in place. The bottom end portion of the strap is passed through the slot of the flange of the vertical panel and folded backwardly and upwardly to place the interlocking fabric sections in a desired position to secure them and set the height of the cushioned pad support at a location most comfortable for a vehicle occupant using the arm rest.

11 Claims, 2 Drawing Sheets

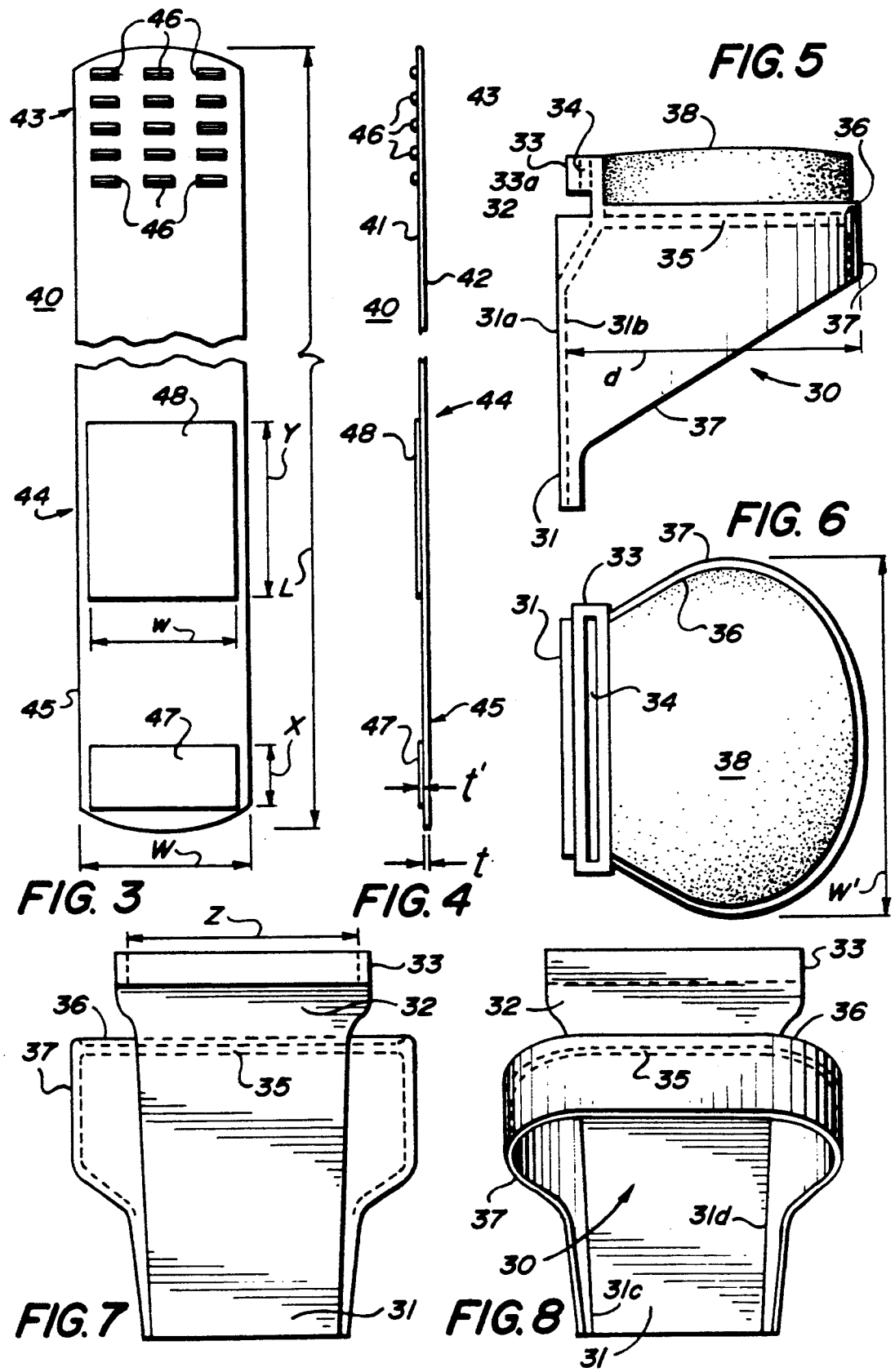

VEHICLE ARM REST

This invention relates to an arm rest for vehicles. More particularly the invention relates to an arm rest which is conveniently mounted by a vehicle occupant on the upper inside panel of a vehicle door, within the window recess or opening, and easily adjusted to make the height of the arm rest convenient for the user-occupant.

BACKGROUND OF THE INVENTION

Arm rests for vehicles and particularly ones that may be conveniently mounted within the window recess opening of a vehicle door frame and then removed have been known and generally available for more than sixty years. A number of such arm rests have been patented and generally such patents are directed to inventions which may be divided into two categories. A first category of arm rests are described in U.S. Pat. No. 1,650,385 to H. Payton; U.S. Pat. No. 2,670,235 to A. J. Susil; U.S. Pat. No. 2,709,620 to E. O. Tinsley et al.; U.S. Pat. No. 2,987,343 to W. P. Stern and U.S. Pat. No. 3,326,600 to P. R. Mathews. Each is directed to a vehicle arm rest designed and constructed to be positioned over the bottom portion of the window frame of a vehicle door when the window glass is in a lowered condition. Disadvantages of this type of arm rest are that it may only be used when the window glass is lowered, and the elevation of the arm rest cannot be adjusted for the comfort of a vehicle occupant. A more adaptable type of arm rest is shown in U.S. Pat. No. 1,984,855 to O. Zwierzina; U.S. Pat. No. 3,603,637 to J. A. DePinto; U.S. Pat. No. 4,890,878 to E. D. Horary et al.; and U.S. Pat. No. 4,592,584 to P. H. White, Jr. The arm rest of each of the latter group of patents is supported only by the inner portion of a vehicle door frame and may be used with the window glass in a raised or lowered condition. In addition, the patents to Zwierzina, DePinto and Horary disclose arm rests having means for vertical adjustment.

While each of the inventions described in the above mentioned patents may be used as an arm rest for a vehicle, some under somewhat restricted conditions, with several having provisions for adjusting the height of the arm rest, each lacks the simplicity of adjustment and construction which would make them readily acceptable to a large segment of vehicle owners and operators.

In addition to the above described prior art, many, if not most, of vehicles offered for sale in the United States during the past five to ten years include arm rests on at least the front doors of the vehicles. However, these arm rests are in an arbitrarily fixed position which is many times not at the most suitable height for many vehicle occupants.

SUMMARY OF THE INVENTION

The arm rest of this invention comprises a frame portion and a flexible strap. The frame includes a vertical panel having a recessed upper section and an outwardly extending base plate. The recessed upper section includes a flange that has a slot, and the base plate includes a peripheral curb on its upper edge. A peripheral wall extends outwardly from the frame panel to the base plate bottom to support the base plate. A cushioned pad is placed on top of the base plate within the peripheral curb. The flexible strap has inside and outside surfaces and an upper portion, an intermediate portion, and a lower portion. A plurality of spaced projections are mounted adjacent the strap upper end, a hook and loop fastener section is mounted adjacent the strap lower end, and a hook and loop fastener section is mounted on the strap intermediate portion. All on the inner surface of the strap.

The arm rest of this invention is mounted on a vehicle door by slipping the upper end of the flexible strap between the door window glass and the adjacent molding that extends along the window gap of the window ledge of the door inner panel. Projections on the inner surface of the strap wedge against the underside of the molding to fix the upper end of the strap in place. The bottom end portion of the strap is passed through the slot of the flange of the arm rest frame portion and folded backwardly to position the hook and fastener section adjacent the strap lower end in a desired position to interlock with the hook and fastener section of the strap intermediate portion to set the height of the cushioned pad of the arm rest frame at a location most comfortable for the car occupant using the arm rest.

BRIEF DESCRIPTION OF THE DRAWINGS

The nature of the invention will be more clearly understood by reference to the following description, the appended claims and the several views illustrated in the accompanying drawings.

FIG. 3 is a plan view of the flexible strap of the arm rest of this invention.

FIG. 4 is a side view of the flexible strap of FIG. 3.

FIG. 5 is a side view of the frame portion of the arm rest of this invention.

FIG. 6 is a top view of the arm rest frame portion of FIG. 5.

FIG. 7 is a back view of the arm rest frame portion of FIG. 5.

FIG. 8 is a front view of the arm rest frame portion of FIG. 5.

DESCRIPTION OF PREFERRED EMBODIMENT

Figure 1:
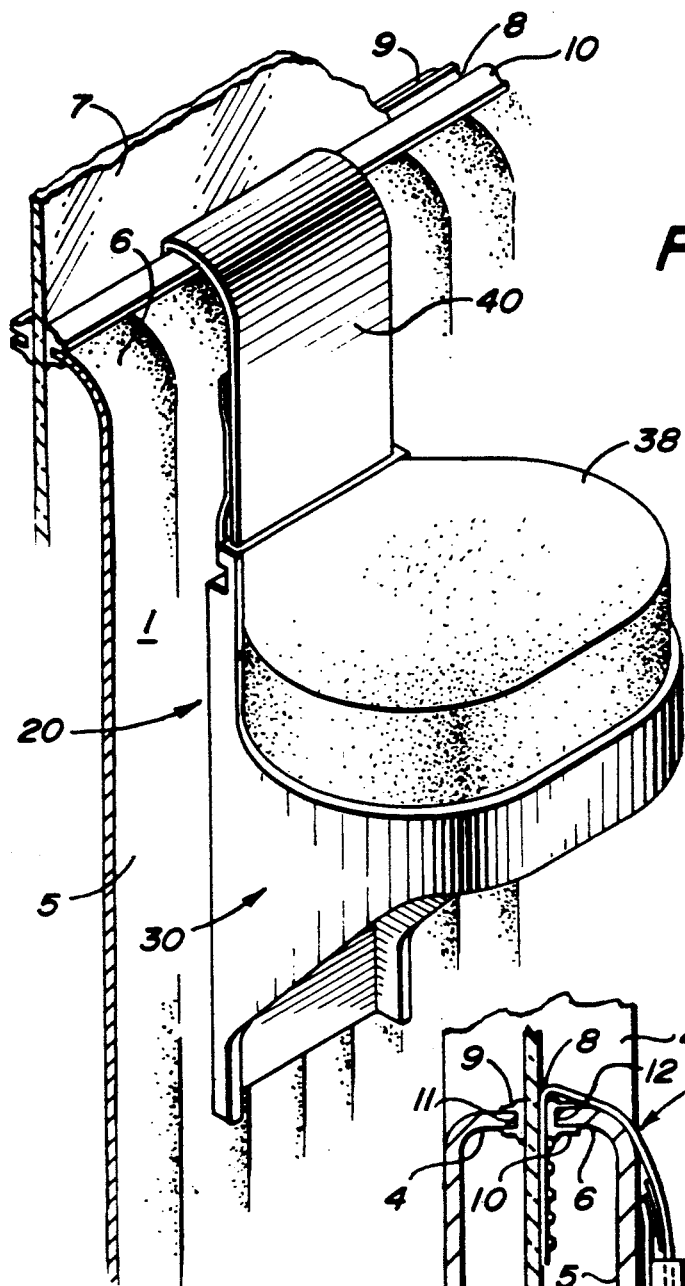
FIG. 1 is an isometric view of the arm rest of the present invention mounted on the bottom of the window opening of a vehicle door to rest against the lower inside panel of the door.
Figure 2:
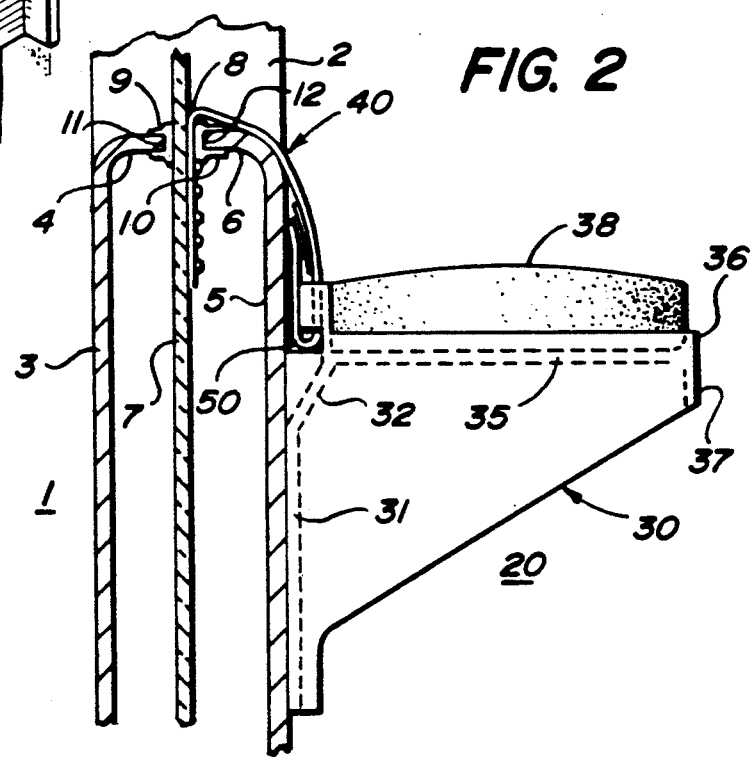
FIG. 2 is a side elevational view, partly in section, of the present invention mounted on the bottom of a window opening of vehicle door to rest against the lower inside panel of the door.

Referring to FIGS. 1 and 2 there are shown a vehicle door 1 having a window opening 2. Vehicle door 1 includes an outside pane]3 having a ledge 4 at the bottom outside of the window opening 2 and an inside panel 5 having a ledge 6 at the bottom inside of window opening 2. Between the panels is a window glass 7 which may be raised or lowered at the option of the vehicle occupant adjacent door 1. Window glass 7 passes through gap 8 which extends the width of door 1, between edge 11 of outside panel ledge 4 and edge 12 of inside panel ledge 6. Molding or weather stripping 9 extends along edge 11 of outside panel window opening ledge 4 and contacts the outer surface of window glass 7 and molding or weather stripping 10 extends along edge 12 of inside panel window opening ledge 6 and contacts the inner surface of window glass 7. The purpose of molding 9 and 10 is to brace glass 7 and keep it from rattling and to prevent water and dirt from easily passing through gap 8 between outside panel 3 and inside panel 5. Arm rest 20, the apparatus of this invention, is mounted on inside door panel 5 and includes arm rest frame 30 and flexible strap 40.

As best shown in FIGS. 3 and 4, strap 40 has an inner surface 41, outer surface 42, upper portion 43, intermediate portion 44, lower portion 45, length L of about fifteen inches, width W of about two inches, and thickness t of about one thirty second of an inch. On strap inner surface 41 of upper portion 43 are several rows of spaced projections 46 which extend outwardly a distance between about 1/16 to ⅛ of an inch. On strap inner surface 41 of intermediate portion 44 is intermediate portion interlocking fabric fastener section 48 and on strap inner surface 41 of lower portion 45 is lower portion interlocking fabric fastener section 47. Fastener sections 47 and 48 have a width w slightly shorter than the width W of strap 40. Fastener section 47 has a length X of about one inch and fastener section 48 has a length Y of about three inches, about three times the length of fastener section 47. Fastener sections 47 and 48 have a thickness t' about one-sixteenth of an inch. A preferred interlocking fabric fastener is the hook and loop type fastener sold under the trademark Velcro. Flexible strap 40 can be made of a number of flexible materials such as canvas, leather, or polyester.

As best shown in FIGS. 5-8, arm rest frame 30 includes support member 31, which has inner surface 31a and outer surface 31b, and plate 35 which supports cushion pad 38. At the upper end of support member 31 is recessed portion 32 having flange 33 extending inwardly from inner surface 31a. Flange 33 has slot 34 extending longitudinally of the length of flange 33. Slot 34 has a length Z of about two and one-half inches, slightly longer than the width W of strap 40 and a thickness T of about one-eighth of an inch, slightly smaller than the combined thicknesses of about three thirty-seconds of an inch of t of strap 40 and t' of each of fastener sections 47 and 48. Plate 35 is supported by a thin wall that extends outwardly and upwardly from outer edges 31c and 31d of support member 31 to the periphery of plate 35 and slightly above its top surface to form curb 36. Support member 40 can be made from a variety of materials but preferably is of plastic. A cushion pad 38 is fastened, as by gluing, on top of plate 35 within curb 36. Plate 35 and cushion pad 38 have a somewhat oval shape. Support member 31 has an overall height H of about four and one-half inches, width W' of about two and one-half inches and plate 35 extends outwardly from support member 31 about three and one-half inches. While plate 35 and cushion pad 38 are shown with a somewhat oval shape, it is obvious that they can be made to any desired shape, such as round, rectangular or oval.

Arm rest 20 is easily mounted on vehicle door 1 as follows. A slight pressure is placed on the lower inside surface of window glass 7 to push it outwardly and away from door inside panel gap molding 10 creating a space between molding 10 and the inside surface of window glass 7. Upper portion 43 of flexible strap 40 is sipped through such space so that outside surface 42 of strap 40 is against the inner surface of window glass 7 and projections 46 on strap inner surface 41 extend toward door inside panel 5, below the elevation of inside panel molding 10. The pressure against the inside surface of window glass 7 is released, and strap 40 is pulled upwardly until one row of projections 46 engages or contacts the inner lower edge of molding 10 so that strap 40 is fixed in place. Flexible strap 10 is then permitted to fold downwardly over the top of molding 10, inside panel window opening ledge 6 and door inside panel 5.

Strap lower portion 45 is passed downwardly through slot 34 of flange 33 of arm rest frame recessed section 32 and folded backwardly so that fabric fastener section 47 of strap lower portion 45 is opposite a portion of fabric fastener section 48 of strap intermediate portion 44. Pressure is then placed against outer surface 42 of strap 40 to press intermediate portion fabric fastener section 48 against lower portion fabric fastener section 47 to lock them together. Locking the fabric fastener sections 47 and 48 permits fold 50 of strap 40 to support the underside of inner portion 33a of frame recess section of flange 33 and establish the height or elevation of the top surface of cushion pad 38 of arm rest 30. The height of pad 38 may be easily adjusted by the vehicle occupant using arm rest 20 by unlocking fabric fastener sections 47 and 48 and moving lower fastener sections 47 upwardly or downwardly on intermediate fastener section 48 and locking the sections together when the desired height of the top surface of pad 38 is most comfortable.

ALTERNATE EMBODIMENTS OF THE INVENTION

Several changes may be made in the preferred embodiment of the invention. In one embodiment flexible strap 40 may be made entirely of fabric fastener material, such as the hook portion of Velcro fastener material and fastener section 48 is made of the loop portion of Velcro fastener material. In another embodiment, flexible strap 40 may be made with fabric fastener sections 47 and 48 placed on strap outer surface 42. With this construction strap or portion 45 is folded forwardly and passed upwardly through slot 34 so that fabric fastener sections 47 on the strap outer surface 42 is moved opposite a portion of fabric fastener section 48, also on strap outside surface 42, and sections are pressed together. The term "flexible strap" as used herein means a pliant strap capable of being bent freely or repeatedly 180° backwardly on itself without breaking.

Arm rest frame may be modified in a variety of ways. Arm rest frame upper section 32 may be made without flange 33 but having a slot extending horizontally a short distance below the upper end of frame support member 31. The preferred or alternate embodiment of strap 40 may be passed in either direction through such slot. Arm rest frame plate 35 may be formed without curb 36 and cushion pad 38 fastened, as by gluing, to the top of plate 35.

While the apparatus of this invention has been described above in a preferred and alternate manner, modifications and variations can be made by those skilled in the art without departing from the spirit and scope thereof as defined in the appended claims.

I claim:

1. An arm rest for mounting on and dismounting from the ledge of a window frame of a vehicle door, having inner and outer door panels, between the upper edge of the inner door panel and the inside surface of a window glass movable in a gap between the upper edges of the door panels, comprising:
   (A) a flexible strap having:
      (1) an upper end portion, and
      (2) means for holding the upper end portion between the inside surface of the window glass and the inner door panel upper edge; and (B) an arm rest frame comprising:
  (1) a support member having:
    (a) means adjacent the upper end thereof for interconnecting with the flexible strap, and
    (b) an outwardly extending plate portion.

2. The arm rest of claim 1 wherein said arm rest frame support member means for interconnecting the flexible strap and the support member has an offset portion adjacent the upper end thereof including:
  (A) a slot therein for passage therethrough of a portion of the flexible strap.

3. The arm rest of claim 1 wherein said flexible strap includes first and second fastener means.

4. The arm rest of claim 3 wherein said first and second fastener means are interlocking fastener portions.

5. The arm rest of claim 3 wherein said first and second fastener means are interlocking fabric fastener portions.

6. An arm rest for mounting on and dismounting from the ledge of a window frame of a vehicle door, having inner and outer door panels, between the upper edge of the inner door panel and the inside surface of a window glass movable in a gap between the upper edges of the inner and outer door panels, comprising:
  (A) a flexible strap having:
    (1) a first end portion having at least one projection on one surface thereof for holding the first end portion between the inside surface of the window glass and the inner door panel upper edge;
    (2) an intermediate portion having interlocking fastener means on one surface thereof; and
    (3) a second end portion having interlocking fastener means on one surface thereof;
  (B) an arm rest frame comprising:
    (1) a vertical support member;
    (2) means adjacent the upper end thereof for interconnecting with the flexible strap;
    (3) pad support means extending outwardly from the vertical support member.

7. The arm rest of claim 6 wherein said interlocking fastener means are of fabric material.

8. The arm rest of claim 6 wherein the strap first end portion projection, intermediate portion interlocking fastener means, and second end portion interlocking fastener means are on a first side of said flexible strip.

9. The arm rest of claim 6 wherein the first end portion projection is on a first side of said flexible strap, and the intermediate portion interlocking fastener means and second end portion interlocking fastener means are on a second side of said flexible strap.

10. The arm rest of claim 6 wherein the flexible strap interconnecting means is an opening adjacent the upper end of said arm rest frame.

11. The arm rest of claim 10 wherein the flexible strap interconnection means is a slot.

* * * * *